US011720802B2

(12) United States Patent
Copty et al.

(10) Patent No.: US 11,720,802 B2
(45) Date of Patent: Aug. 8, 2023

(54) GENETIC FUZZING FOR CUSTOMIZATION OF SECURITY OPERATIONS CENTER RULES PER ORGANIZATION

(71) Applicant: International Business Machines Corporation, Armonk, NY (US)

(72) Inventors: Fady Copty, Nazareth (IL); Benjamin Zeltser, Haifa (IL)

( * ) Notice: Subject to any disclaimer, the term of this patent is extended or adjusted under 35 U.S.C. 154(b) by 492 days.

(21) Appl. No.: 16/801,173

(22) Filed: Feb. 26, 2020

(65) Prior Publication Data
US 2021/0264286 A1 Aug. 26, 2021

(51) Int. Cl.
*G06N 3/126* (2023.01)
*G06F 21/57* (2013.01)
*G06N 5/02* (2023.01)

(52) U.S. Cl.
CPC ........... *G06N 3/126* (2013.01); *G06F 21/577* (2013.01); *G06N 5/02* (2013.01); *G06F 2221/034* (2013.01)

(58) Field of Classification Search
CPC ........ G06N 3/126; G06N 5/02; G06F 21/577; G06F 2221/034
See application file for complete search history.

(56) References Cited

U.S. PATENT DOCUMENTS

| 9,807,109 B2 | 10/2017 | Laidlaw | |
| 2007/0112824 A1* | 5/2007 | Lock | G06F 11/0754 707/999.102 |
| 2015/0006458 A1* | 1/2015 | Zadka | G06N 5/022 706/47 |
| 2018/0150035 A1* | 5/2018 | Chen | G05B 13/0265 |
| 2022/0035927 A1* | 2/2022 | Lysecky | H04L 63/1416 |

OTHER PUBLICATIONS

Srinivasa, K.. (Jan. 4, 2012). Application of Genetic Algorithms for Detecting Anomaly in Network Intrusion Detection Systems. 582-591.
Alabsi, Firas & Naoum, Reyadh. (Jan. 2012). Fitness Function for Genetic Algorithm used in Intrusion Detection System. Internal Journal of Applied Science and Technology.
Goyal, Anup & Kumar, Chetan. (2007). GA-NIDS: A Genetic Algorithm based Network Intrusion Detection System.
Guillermo Suarez-Tangil, Esther Palomar, Arturo Ribagorda, Ivan Sanz. Providing SIEM systems with self-adaptation, Information Fusion, vol. 21, Jan. 2015, pp. 145-158.

* cited by examiner

*Primary Examiner* — Kevin Bechtel
*Assistant Examiner* — Forrest L Carey
(74) *Attorney, Agent, or Firm* — Gregory J Kirsch

(57) ABSTRACT

Embodiments may provide techniques that that may automatically generate a customized SOC rule set for an organization. For example, in an embodiment, a method may be implemented in a computer comprising a processor, memory accessible by the processor, and computer program instructions stored in the memory and executable by the processor, the method may comprise simulating operation of a security incident and event management system by running a plurality of rules of the system on labeled data, determining fitness metrics of the plurality of rules, selecting at least one rule of the plurality of rules based on the determined fitness metrics; modifying the selected rule to form an updated rule, and repeating running the updated rule on the labeled data, determining fitness metrics of the updated rule, and mutating the updated rule.

17 Claims, 4 Drawing Sheets

GENETIC FUZZING FOR CUSTOMIZATION OF SECURITY OPERATIONS CENTER RULES PER ORGANIZATION

BACKGROUND

The present invention relates to techniques that may automatically generate a customized SOC rule set for an organization.

Security Operations Center (SOC) tools may utilize both security information management and security event management data to provide real-time analysis of security alerts generated by applications and network hardware. Typically, SOC tools have default rules for orchestrating the various events, incidents, netflows, and captures coming from various sources. These default rules require manual customization per SOC deployment due to different organization-system-architecture. Customization of the default rules is labor intensive and requires a highly skilled security analyst. Further, poorly customized rules may become a burden on the security team and may create problems and wasted time and effort in the form of a false-positive and false-negatives.

Accordingly, a need arises for techniques that may automatically generate a customized SOC rule set for an organization.

SUMMARY

Embodiments may provide techniques that that may automatically generate a customized SOC rule set for an organization. Embodiments may apply genetic techniques on default or given rules while using a given dataset as a simulation environment dataset. Embodiments may apply a defined fitness function over the simulation of rules and sub-rules such that it maximizes sub-rule deviation, sub-rule coverage, rule simplicity, and accuracy. Embodiments may then mutate the default or given rules using predefined sets of time-windows, threshold, lists of similar system constructs, etc. Embodiments may additionally harvest IP addresses, machine names, user names, etc., and use them to mutate whitelists and/or blacklists. Further, embodiments may use crossover on sub rules. Embodiments may then apply the simulation environment dataset to the mutated rules and iterate until rule fitness goals have been reached.

For example, in an embodiment, a method may be implemented in a computer comprising a processor, memory accessible by the processor, and computer program instructions stored in the memory and executable by the processor, the method may comprise simulating operation of a security incident and event management system by running a plurality of rules of the system on labeled data, determining fitness metrics of the plurality of rules, selecting at least one rule of the plurality of rules based on the determined fitness metrics; modifying the selected rule to form an updated rule, and repeating running the updated rule on the labeled data, determining fitness metrics of the updated rule, and mutating the updated rule.

In embodiments, the plurality of rules of the system may comprise one of: default rules, given rules, or current rules. The labeled data may comprise at least some data labeled as benign and at least some data labeled as malicious. The labeled data may comprise at least one of: data relating to security devices, data relating to servers and host systems, network and virtual activity data, database activity data, application activity, configuration data, vulnerability data, user activity data, and threat data. The fitness metrics may comprise at least one of: a deviation, a coverage, and a simplicity of the rules. Modifying the selected rule may comprise at least one of: mutating the rule using numeric mutations, predefined mutations, or both, semantic mutations, harvesting of IP addresses, and crossover. The method may further comprise at least one of: performing rule minimization comprising deleting rules that cover malicious events that are already covered by other rules, rule prioritization comprising prioritizing rules that cover more malicious events and/or fewer benign events, and defining rules to control the response to detected conditions comprising providing configuration of rules to block activity without reducing availability.

In an embodiment, a system may comprise a processor, memory accessible by the processor, and computer program instructions stored in the memory and executable by the processor to perform simulating operation of a security incident and event management system by running a plurality of rules of the system on labeled data, determining fitness metrics of the plurality of rules, selecting at least one rule of the plurality of rules based on the determined fitness metrics, modifying the selected rule to form an updated rule, and repeating running the updated rule on the labeled data, determining fitness metrics of the updated rule, and mutating the updated rule.

In an embodiment, a computer program product may comprise a non-transitory computer readable storage having program instructions embodied therewith, the program instructions executable by a computer, to cause the computer to perform a method comprising simulating operation of a security incident and event management system by running a plurality of rules of the system on labeled data, determining fitness metrics of the plurality of rules, selecting at least one rule of the plurality of rules based on the determined fitness metrics, modifying the selected rule to form an updated rule, and repeating running the updated rule on the labeled data, determining fitness metrics of the updated rule, and mutating the updated rule.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques that that may automatically generate a customized SOC rule set for an organization. Embodiments may apply genetic techniques on default or given rules while using a given dataset as a simulation environment dataset. Embodiments may apply a defined fitness function over the simulation of rules and sub-rules such that it maximizes sub-rule deviation, sub-rule coverage, rule simplicity, and accuracy. Embodiments may then mutate the default or given rules using predefined sets of time-windows, threshold, lists of similar system constructs, etc. Embodiments may additionally harvest IP addresses, machine names, user names, etc., and use them to mutate whitelists and/or blacklists. Further, embodiments may use crossover on sub rules. Embodiments may then apply the simulation environment dataset to the mutated rules and iterate until rule fitness goals have been reached.

Embodiments may enhance these techniques to create "availability friendly response rules" by mutating sub rules only and changing the fitness function in a way that penalizes false positives higher than false negatives. Further, embodiments may block sub-rule building blocks on a sub-rule hit.

Figure 1:
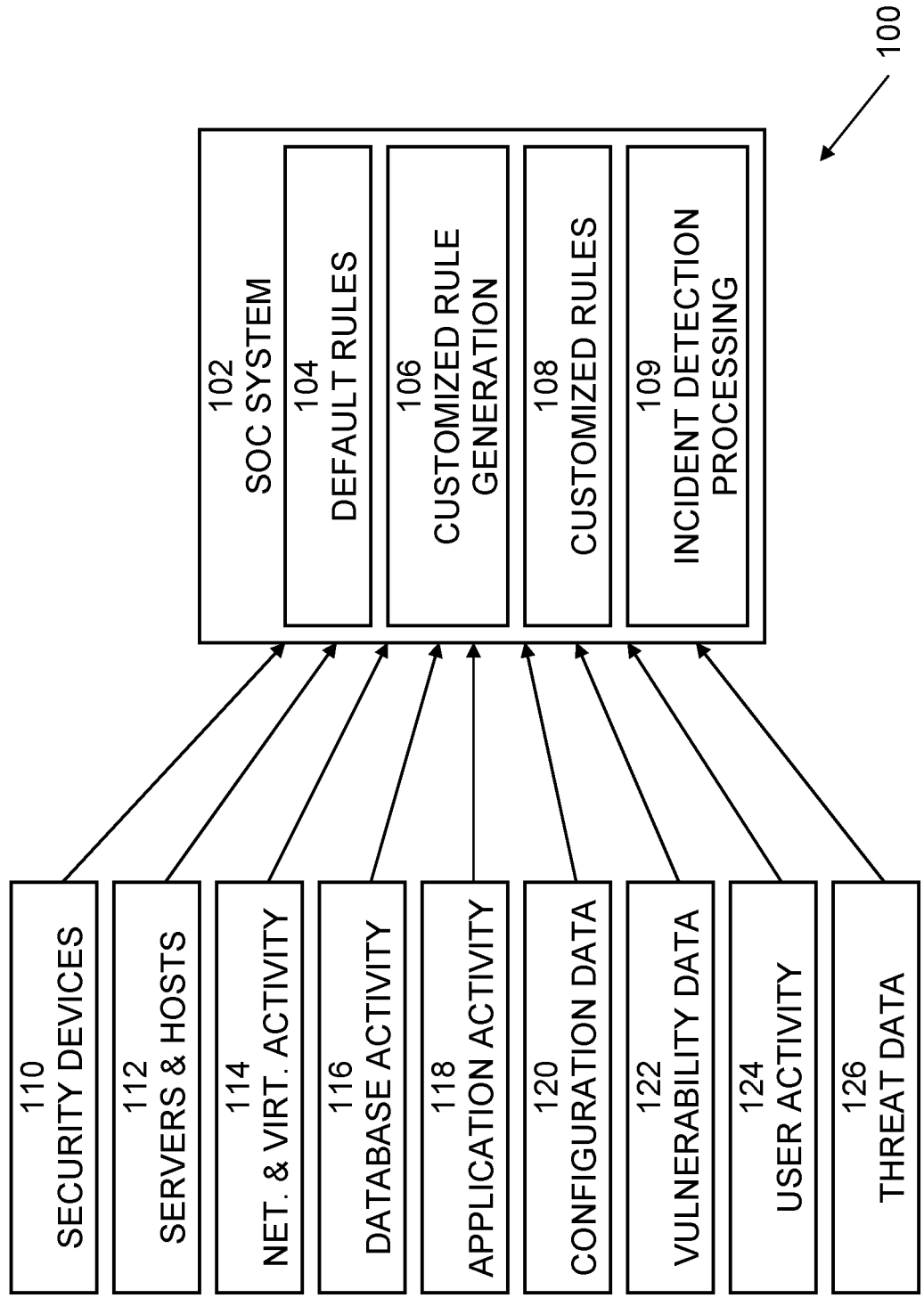
FIG. 1 illustrates an exemplary environment in which a Security Incident & Event Management (SOC) system may be implemented according to embodiments of the present techniques.

An exemplary environment 100 in which a Security Operations Center (SOC) system 102 utilizing the present techniques may be implemented is shown in FIG. 1. SOC system 102 may include data and processing blocks such as default (or given) rules 104, customized rule generation block 106, customized rules 108, and incident detection processing block 109. Default (or given) rules 104 may include default rules—predefined rules for handling default or generic situations, or given rules—existing rules that may not be directed towards organizations using system 102 and/or situations likely to be encountered. Customized rule generation block 106 may include processing functionality to accept default (or given) rules 104 and to automatically generate a customized SOC rule set 108 for an organization or situations. Incident detection processing block 109 may perform detection of security incidents and events during operation of the system being monitored.

SOC system 102 may accept configuration and activity data for processing. Examples of data sources and data types that may be accepted by SOC system 102 include data relating to security devices 110, data relating to servers and host systems 112, network and virtual activity data 114, database activity data 116, application activity 118, configuration data 120, vulnerability data 122, user activity data 124, and threat data 126. Data relating to security devices 110 may include data specifying security device types, numbers, network locations, etc. Data relating to servers and host systems 112 may include data specifying servers and host system device types, numbers, network locations, etc. Network and virtual activity data 114 may include data relating to network traffic and activity, as well as virtual traffic and activity, etc. Database activity data 116 may include data relating to database traffic, activity, storage, etc. Application activity data 118 may include data relating to application activity, such as types of applications, numbers of instances, runtimes, etc. Configuration data 120 may include data relating to configurations of hardware and software being monitored. Vulnerability data 122 may include data relating to hardware and software vulnerabilities of systems being monitored. User activity data 124 may include data relating activities of users of systems being monitored. Threat data 126 may include data relating to threats, such as security threats, to systems being monitored. Data of types such as data 110-126 may be processed by incident detection processing block 109 to perform detection of security incidents and events during operation of the system being monitored. Labeled data of such data types may be processed by customized rule generation block 106 to generated customized rules 108.

Figure 2:
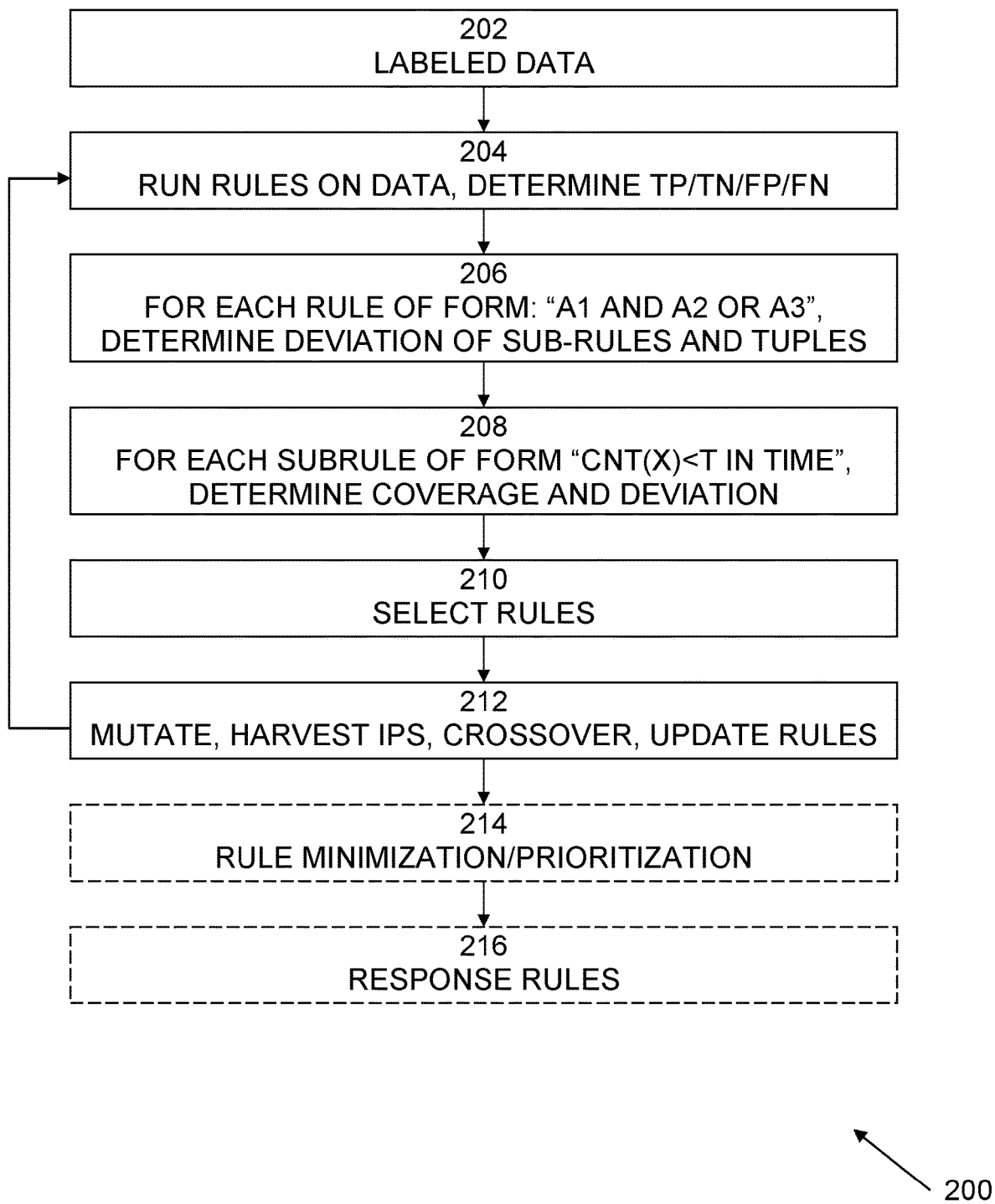
FIG. 2 is an exemplary flow diagram of a process of automatic customized SOC rule generation according to embodiments of the present techniques.

An exemplary process 200 of automatic customized SOC rule generation is shown in FIG. 2. Process 200 begins with 202, in which, labeled data, such as data of types such as data 110-126 may be received by SOC system 102 for processing by customized rule generation block 106. The data may be labeled, for example, as benign or malicious, and may be organized as two separate datasets, one benign and one malicious, or may be organized with benign and malicious data intermixed. The labeled data may be used as rule simulation data.

At 204, one or more default (or given) rules may be run on the simulation defined by the rule simulation data. Such rules may, for example, be of the form "counter of X did not exceed threshold within the time window" (where X is a monitored condition), whitelists, blacklists, etc. On a sliding window over the rules simulation data, a positive may be defined as an alert being generated by the rules and a negative may be defined as a non-alert, which is an alert not being generated by the rules. Results data, such as a number of true positives, true negative, false positives and false negatives (TP/TN/FP/FN), a rate of TP/TN/FP/FN per rule, a rate of TP/TN/FP/FN per day (FPR-TPR), etc., may be determined based on the operation of the rule or rules in the simulation defined by the rule simulation data. The truth or falseness of positives and negative may be defined based on the dataset being processed, that is whether the dataset is benign or malicious. For example, a benign dataset should produce negatives at a significantly higher rate than positives, while a malicious dataset should produce positives at a significantly higher rate than negatives.

In order to determine TP/TN/FP/FN, at 206, for each rule of the form "A1 and A2 or A3" (where A1, A2, and A3 are sub-rules) the deviation per simulation period of each sub-rule and tuple of sub-rules may be determined. For example, deviation per simulation period of each sub-rule, such as A1, A2, etc., and for each tuple of sub-rules "A1 and A2" "A1 or A3", etc., may be determined. At 208, where each sub-rule A is of the form "counter of X did not exceed threshold within the time window" (where X is a monitored condition), fitness metrics may be determined. For example, for each sub-rule and tuple, the fitness metrics may include: the simplicity of condition X based on a number of raw data fields used in determining condition X, a coverage of the threshold based on coverage buckets, a deviation of "counter of X in time window", a deviation of sub-rule/tuple values per entire simulation period, and coverage of malicious events by rule set. For example, simplicity may be determined according to: for every rule of the from "counter of X>threshold", X may be composed of a Boolean formula of basic features in the data-set. For example X may include "src ip=<value 1> and src_port=<value 2> and dst_port=<value 3> and result=<value 4>". The simplicity score may be determined according to 1/(number of features used for X). For the example above simplicity=0.25 For example, the deviation of a rule of the form "counter of X in time window" may be determined as the standard deviation from the mean of the value of "counter of X in time window". For example, the deviation of sub-rule/tuple values per entire simulation period may be determined as the standard deviation from the mean of the sub-rule/tuple values per entire simulation period. Likewise, the coverage of malicious events by rule set may be determined as the "contribution" of each rule to the overall coverage of malicious events. The contribution of a rule may be determined as the addition to the number of malicious events captured by adding the rule to the rule-set. To determine a final fitness score per rule, a weighted formula of the above four metrics may be used, such as: fitness=weight1*simplicity+weight2*deviation+weight3*deviation(sub-rule/tuple)+weight4*coverage.

At 210, rules may be selected for mutation. For example, rule having the highest deviation, coverage, and simplicity and the lowest FPR-TPR may be selected to create genetic mutations. At 212, the selected rules may be mutated using predefined sets of time-windows, threshold, and lists of similar system constructs. For example, rules may be mutated using predefined time windows. Examples of time windows may include 10 seconds, 1 minute, 10 minutes, 1 hour, 12 hours, 1 day, 1 week, etc., as appropriate to each rule. For example, rules may be mutated using predefined a threshold. Example of thresholds may include 1 (Boolean), 10, 100, 1000, etc., as appropriate to each rule. Likewise, IP addresses may be harvested, along with, machine names, user names, etc., and the harvested information may be used to mutate whitelists and blacklist. Exemplary IP addresses may include "1.1.1.1" "127.0.0.1" "138.25.4.12", etc., and exemplary machine names may include machine1.org.com, etc. Further, crossover mutations, semantic mutations (such as replacing afs with ntfs), and numeric mutations may be performed on rules. Exemplary crossover mutations may include: given 2 rules, such as (A1 and A2 or A3) and (B1 or B2 and B3), an example cross over may be (A1 and B2 and B3), or (A1 and A2 or B2 and B3), etc. Exemplary crossover semantic mutations may include using predefined mutations that can reason about semantics. For example, the condition "success" in a rule may be replaced with the condition "fail" in a rule such as "src ip=<value> and src_port=<value 2> and dst_port=<value 3> and result=success". Further examples are described below. Exemplary numeric mutations examples may include bit flipping of "IP=127.0.0.1" to "IP=127.0.0.0", etc. The current set of rules may then be updated based on the mutations. Process 200 may then loop back to 204 and run the updated rules on the simulation defined by the original, additional, or alternative rule simulation data. Processing 204 to 212 may be repeated until a timeout or maximum number of iterations is reached, or until the determined FPR-TPR has reached a predetermined level.

At 214, embodiments may perform rule minimization/rule prioritization may be performed on the customized rule set. For example, rules may be prioritized that cover more malicious events and/or fewer benign events. Further, rules that cover malicious events that are already covered by other rules may be deleted.

At 216, embodiments may define rules to control the response to detected conditions. Such rules may provide configuration of rules to block activity without damaging availability of the system (automatic response rules). Given the customized rule set, the sub-rules may be used as the starting rule set ("counter of X did not exceed threshold with time window"). This sub-rule starting rule set may be mutated such that only the sub rules are mutated, without cross-over. The fitness determination for creating rules may be changed such that false-positives are penalized much more than false-negatives, thus conditions that damage availability may be highly penalized. For example, a response rule may be defined as follows: for each sub-rule A1, of the form "counter of X did not exceed threshold with time window", if sub rule A1 fires, then a response may be performed, but the performance of the response may be blocked for a predefined time window. Since A1 does not produce false-positives, blocking X when A1 fires is safe.

Figure 3:
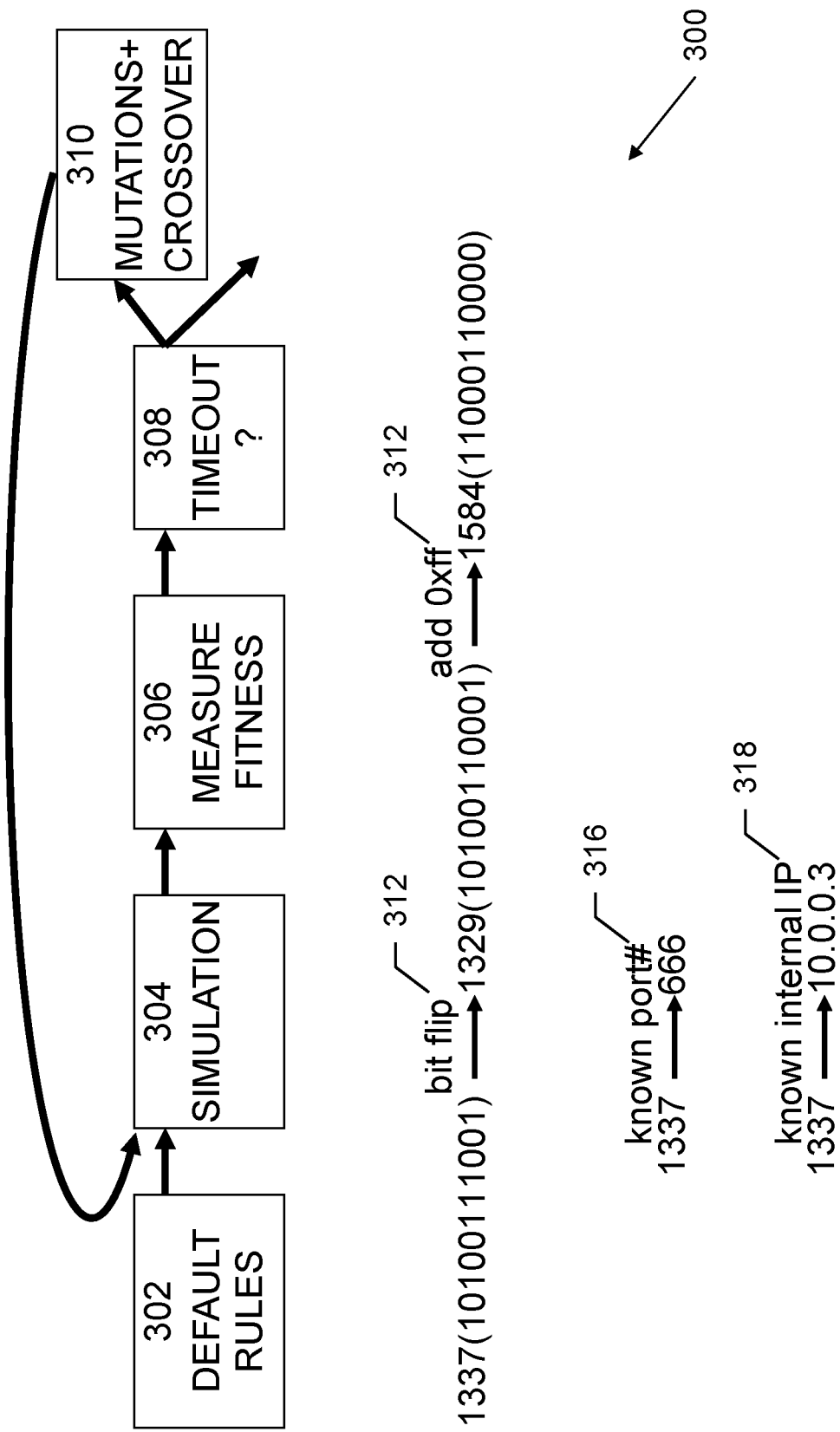
FIG. 3 is an exemplary block diagram of processing according to embodiments of the present techniques.

An exemplary embodiment 300 of processing according to the present techniques is shown in FIG. 3. In this example default rules 302 may include one or more rules A of the form "A1 and A2 or A3", and each sub rule A1, A2, and A3 is of the form "counter of X did not exceed threshold with time window". Simulation 304 using benign and malicious dataset may be performed. At 306, fitness of the each rule A may be determined. For example, a fitness function for each rule A may be of the form FPR TPR of A. For example, on the given threshold as the sliding window period, A may fire 30 times on benign data, 20 times on malicious data, and A may not fire 70 times on benign data, 10 times on malicious data. In this example, FPR=30% (30/(30+70)), TPR=66% (20/(20+10)). Then the coverage of malicious events by a new rule may be determined. For example, a new rule may extend coverage of malicious events by 1%. The for each sub rule, the standard deviation of counter of X in time period may be determined. For example, a counter of access to port 443 per minute shows a mean of 100, and standard deviation of 10.

At 308, it may be determined whether a timeout or maximum number of iterations has been reached, or whether the determined FPR-TPR has reached a predetermined level. If not, then at 310, modification and updating of each rule A may be performed. Such modifications may include, for example, mutation, harvesting of IP addresses, crossover, etc. For example, mutations may include numeric mutations and predefined mutations. Examples of numeric mutations may include bit flipping 312 and addition of determined integers 314. For example, a rule that operates on port 1337(10100111001) may be mutated with a bit flip 312 to form port 1329(10100110001), and that port may be mutated with addition of a determined integer 314, in the example 0xff, to form port 1584(11000110000). Predefined mutations may include, for example, insertion of predefined number, such as replacing 316 port 1337 with a known port 666, or replacing a number with a known internal IP address 318, such as replacing 1337 with 10.0.0.3. Further, machine names, user names, IP addresses, etc., may be harvested, random numeric alterations may be made, and semantic mutations, such as replacing IP with ICMP, SMB with NETBIOS, AFS with NTFS, etc.

Figure 4:
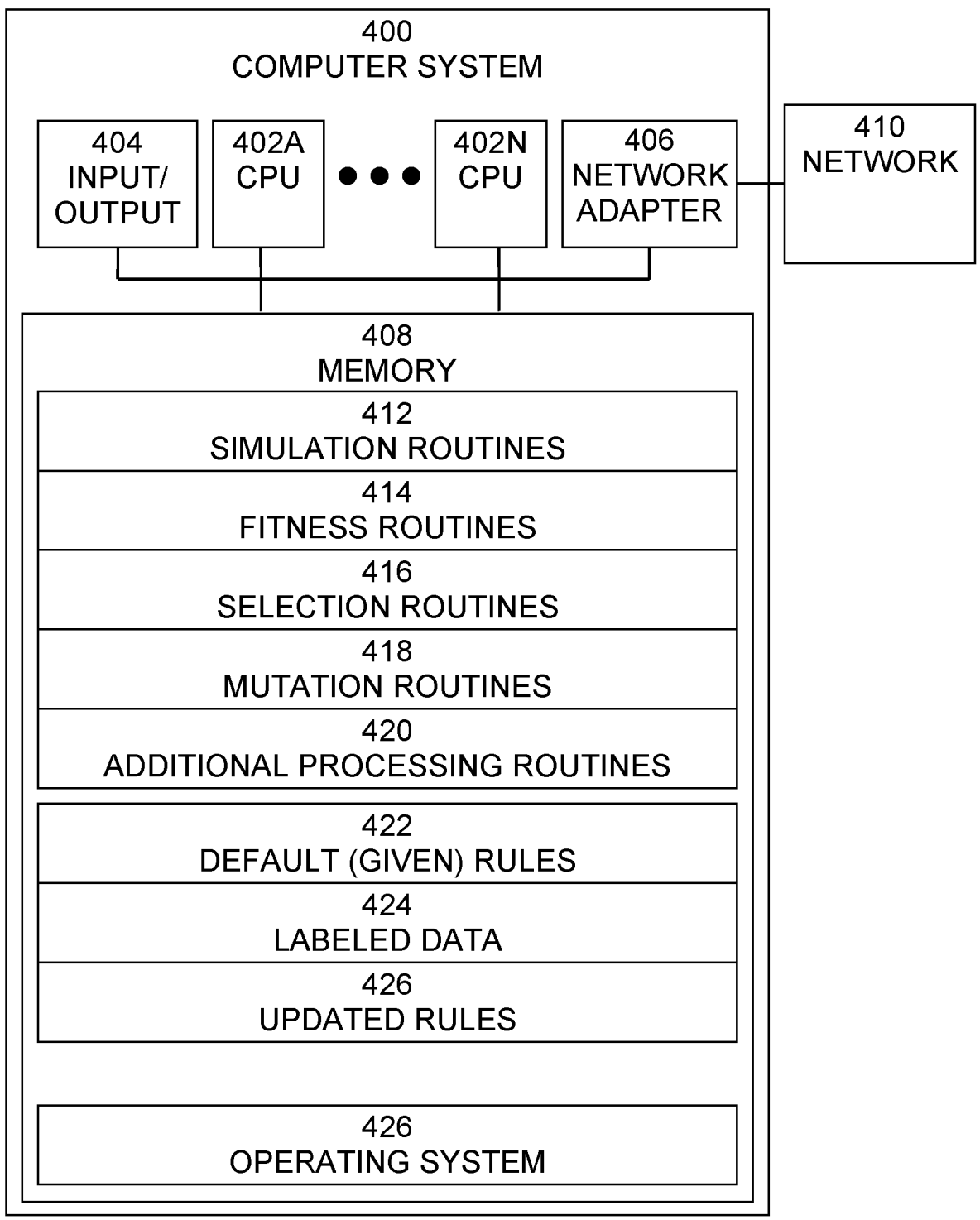
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include simulation routines 412, fitness routines 414, selection routines 416, mutation routines 418, additional processing routines 420, default (given) rules 422, labeled data 424, updated rules 426, and operating system 422. Simulation routines 412 may include software routines to perform simulation on the default (given) or current rules using labeled data 424, as described above. Fitness routines 414 may include software routines to determine fitness of the rules based on the simulation, as described above. Selection routines 416 may include software routines to select rules to mutate based on the determined fitness, as described above. Mutation Routines 418 may include software routines to mutate the selected rules to form updated rules 426, as described above. Additional processing routines 420 may include software routines to perform additional processing such as rule minimization/prioritization and generation of response rules, as described above. Default (given) rules 422 may default rules, given rules, or current state of rules, as described above. Labeled data 424 may include data labeled as benign or malicious, as described above. Updated rules 426 may include rules that have been updated, as described above. Operating system 422 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer comprising a processor, memory accessible by the processor, and computer program instructions stored in the memory and executable by the processor, the method comprising:
   simulating operation of a security incident and event management system by running a plurality of rules of the system on labeled data;
   determining fitness metrics of the plurality of rules, wherein the fitness metrics include:
      a standard deviation of values of each sub-rule and of each tuple of sub-rules from a mean of the values of each of the sub-rules and each tuple of the sub-rules per a simulation period for a first rule of the plurality of rules;
      an additional coverage of events associated with the first rule of the plurality of rules; and
      a reciprocal of a number of data fields used in the first rule of the plurality of rules;
   selecting at least one rule of the plurality of rules based on the determined fitness metrics;
   modifying the selected rule to form an updated rule; and
   repeatedly running the updated rule on the labeled data, determining fitness metrics of the updated rule, and mutating the updated rule until reaching one of a predetermined level of fake positive rate-true positive rate (FPR-TPR), a timeout, or a maximum number of repetitions.

2. The method of claim 1, wherein the plurality of rules of the system comprise one of: default rules, given rules, or current rules.

3. The method of claim 1, wherein the labeled data comprises at least some data labeled as benign and at least some data labeled as malicious.

4. The method of claim 1, wherein the labeled data comprises at least one of: data relating to security devices, data relating to servers and host systems, network and virtual activity data, database activity data, application activity data, configuration data, vulnerability data, user activity data, and threat data.

5. The method of claim 1, wherein modifying the selected rule comprises at least one of: mutating the rule using random numeric mutations, predefined mutations, semantic mutations, harvesting of IP addresses, and crossover.

6. The method of claim 1, further comprising at least one of: performing rule minimization, rule prioritization, and defining rules to control the response to detected conditions.

7. A system comprising a processor, memory accessible by the processor, and computer program instructions stored in the memory and executable by the processor to perform:
   simulating operation of a security incident and event management system by running a plurality of rules of the system on labeled data;
   determining fitness metrics of the plurality of rules, wherein the fitness metrics include:
      a standard deviation of values of each sub-rule and of each tuple of sub-rules from a mean of the values of each of the sub-rules and each tuple of the sub-rules per a simulation period for a first rule of the plurality of rules;
      an additional coverage of events associated with the first rule of the plurality of rules; and
      a reciprocal of a number of data fields used in the first rule of the plurality of rules;
   selecting at least one rule of the plurality of rules based on the determined fitness metrics;
   modifying the selected rule to form an updated rule; and
   repeatedly running the updated rule on the labeled data, determining fitness metrics of the updated rule, and mutating the updated rule until reaching one of a predetermined level of fake positive rate-true positive rate (FPR-TPR), a timeout, or a maximum number of repetitions.

8. The system of claim 7, wherein the plurality of rules of the system comprise one of: default rules, given rules, or current rules.

9. The system of claim 7, wherein the labeled data comprises at least some data labeled as benign and at least some data labeled as malicious.

10. The system of claim 7, wherein the labeled data comprises at least one of: data relating to security devices, data relating to servers and host systems, network and virtual activity data, database activity data, application activity, configuration data, vulnerability data, user activity data, and threat data.

11. The system of claim 7, wherein modifying the selected rule comprises at least one of: mutating the rule using random numeric mutations, predefined mutations, semantic mutations, harvesting of IP addresses, and crossover.

12. The system of claim 7, further comprising at least one of: performing rule minimization, rule prioritization, and defining rules to control the response to detected conditions.

13. A computer program product comprising a non-transitory computer readable storage having program instructions embodied therewith, the program instructions executable by a computer, to cause the computer to perform a method comprising:
   simulating operation of a security incident and event management system by running a plurality of rules of the system on labeled data;
   determining fitness metrics of the plurality of rules, wherein the fitness metrics include:
      a standard deviation of values of each sub-rule and of each tuple of sub-rules from a mean of the values of each of the sub-rules and each tuple of the sub-rules per a simulation period for a first rule of the plurality of rules;
      an additional coverage of events associated with the first rule of the plurality of rules; and
      a reciprocal of a number of data fields used in the first rule of the plurality of rules;
   selecting at least one rule of the plurality of rules based on the determined fitness metrics;
   modifying the selected rule to form an updated rule; and
   repeatedly running the updated rule on the labeled data, determining fitness metrics of the updated rule, and mutating the updated rule until reaching one of a predetermined level of false positive rate-true positive rate (FPR-TPR), a timeout, or a maximum number of repetitions.

14. The computer program product of claim 13, wherein the plurality of rules of the system comprise one of: default rules, given rules, or current rules.

15. The computer program product of claim 13, wherein the labeled data includes at least some data labeled as benign and at least some data labeled as malicious and wherein the labeled data comprises at least one of: data relating to security devices, data relating to servers and host systems, network and virtual activity data, database activity data, application activity data, configuration data, vulnerability data, user activity data, and threat data.

16. The computer program product of claim 13, wherein modifying the selected rule comprises at least one of: mutating the rule using random numeric mutations, predefined mutations, semantic mutations, harvesting of IP addresses, and crossover.

17. The computer program product of claim 13, further comprising at least one of: performing rule minimization, rule prioritization, and defining rules to control the response to detected conditions.

* * * * *